(12) United States Patent
Torres et al.

(10) Patent No.: US 11,451,527 B2
(45) Date of Patent: Sep. 20, 2022

(54) SYSTEM AND METHOD FOR SECURE TWO-PARTY EVALUATION OF UTILITY OF SHARING DATA

(71) Applicant: Palo Alto Research Center Incorporated, Palo Alto, CA (US)

(72) Inventors: Francisco E. Torres, San Jose, CA (US); Vanishree Hanumantha Rao, San Mateo, CA (US); Shantanu Rane, Menlo Park, CA (US); Yunhui Long, Urbana, IL (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 211 days.

(21) Appl. No.: 17/016,073

(22) Filed: Sep. 9, 2020

(65) Prior Publication Data

US 2020/0412702 A1 Dec. 31, 2020

Related U.S. Application Data

(63) Continuation of application No. 15/714,803, filed on Sep. 25, 2017, now Pat. No. 10,805,281.

(51) Int. Cl.
*H04L 9/40* (2022.01)
*H04L 67/141* (2022.01)
*H04L 67/02* (2022.01)
*H04L 67/146* (2022.01)

(52) U.S. Cl.
CPC ........ *H04L 63/061* (2013.01); *H04L 63/0435* (2013.01); *H04L 63/0442* (2013.01); *H04L 63/0853* (2013.01); *H04L 67/02* (2013.01); *H04L 67/141* (2013.01); *H04L 67/146* (2013.01); *H04L 63/1416* (2013.01)

(58) Field of Classification Search
CPC .......... G06Q 2220/00; G06Q 20/38215; H04L 2463/102; H04L 63/0421; H04L 63/0428
See application file for complete search history.

(56) References Cited

U.S. PATENT DOCUMENTS

2016/0371684 A1* 12/2016 Abbott ................ H04L 63/0421
2017/0011030 A1* 1/2017 Huang ................... G06F 16/951

* cited by examiner

*Primary Examiner* — Olugbenga O Idowu
(74) *Attorney, Agent, or Firm* — Shun Yao; Yao Legal Services, Inc.

(57) ABSTRACT

Embodiments described herein provide a system for improving a classifier by computing a statistic for the utility of sharing data with a second party. The system may encrypt a set of class labels based on a public key/private key pair to obtain a set of encrypted class labels. The system may send a public key and the set of encrypted class labels to a second computing device. The system may receive an encrypted value computed by the second computing device based on the public key. The system may decrypt the encrypted value based on a private key to obtain a decrypted value. The system may then send a pair of encrypted values computed based on the decrypted value to the second computing device. The system may subsequently receive an encrypted utility statistic from the second computing device, and decrypt the encrypted utility statistic to obtain a decrypted utility statistic.

20 Claims, 14 Drawing Sheets

SYSTEM AND METHOD FOR SECURE TWO-PARTY EVALUATION OF UTILITY OF SHARING DATA

RELATED APPLICATION

This application is a continuation of U.S. patent application Ser. No. 15/714,803, entitled "SYSTEM AND METHOD FOR SECURE TWO-PARTY EVALUATION OF UTILITY OF SHARING DATA," by inventors Francisco E. Torres, Vanishree Hanumantha Rao, Shantanu Rane, and Yunhui Long, filed on 25 Sep. 2017.

STATEMENT OF GOVERNMENT-FUNDED RESEARCH

This invention was made with U.S. government support under Contract No. DTFH6115H00006 awarded by the U.S. Department of Transportation, Federal Highway Administration. The U.S. government has certain rights in the invention.

BACKGROUND

Field

This disclosure is generally related to machine learning. More specifically, this disclosure is related to a method and system for evaluating utility of sharing feature data.

Related Art

IBM reported that, every day, we create 2.5 quintillion bytes of data, and 90% of the data in the world today has been created in the last two years alone. Given the data's usefulness to various stakeholders, data trading will grow into an important business.

Data on different aspects of a system may be captured by different stakeholders. In order to get a complete perspective of the system, data can be traded between the stakeholders.

For instance, in an Internet of things (IoT) ecosystem, generally, IoT devices are owned by different owners (manufacturers, service providers, consumers, etc.), where data collected by a single owner provides only a partial view of the system.

Identifying trading partners and determining the value of the data can be a tricky challenge, particularly because the value would depend on the quality and content of the data. A party seeking to obtain data may want the data only if the value or utility of the data can be determined beforehand. However, the data owner may not want to reveal the content of the data before agreeing on terms for transferring the data. Thus, it is important to securely measure utility of data without access to the actual data.

SUMMARY

Embodiments described herein provide a system for securely estimating the utility of combining data from two or more parties. During operation, the system may exchange, in multiple rounds, encrypted data and encrypted statistics computed for the data. A statistic is a measure derived from one or more attributes of the data. The system may build an encrypted utility statistic using computations in an encrypted domain without sharing private decryption keys. One or more parties may then apply a respective private decryption key to decrypt the encrypted utility statistic to obtain a utility statistic.

In a variation on this embodiment, the system may determine that the utility statistic exceeds a predetermined threshold and request a set of data from the second computing device. The system may apply the set of data to improve a classifier.

Another embodiment described herein includes a system for obtaining a utility statistic. During operation, the system may encrypt a set of class labels based on a public key/private key pair to obtain a set of encrypted class labels. The system may send a public key and the set of encrypted class labels to a second computing device. The system may receive an encrypted value computed by the second computing device based on the public key. The system may decrypt the encrypted value based on a private key to obtain a decrypted value. The system may then send a pair of encrypted values computed based on the decrypted value to the second computing device. The system may subsequently receive an encrypted utility statistic from the second computing device, and decrypt the encrypted utility statistic to obtain a decrypted utility statistic.

In a variation on this embodiment, sending the pair of encrypted values further includes computing a pair of values based on the decrypted value. The system may also encrypt, based on the public key, the pair of values to obtain the pair of encrypted values.

In a variation on this embodiment, the system may determine that the decrypted utility statistic exceeds a predetermined threshold. The system may request a set of data from the second computing device, and apply the set of data to improve the classifier In a variation on this embodiment, the class labels are associated with binary attributes.

In a variation on this embodiment, the system may send a request to the second computing device to compute a utility statistic.

In a variation on this embodiment, sending the public key and the set of encrypted class labels further includes computing a value based on a sum of elements of a feature vector which includes the set of class labels. The system may encrypt the computed value, and send the encrypted value to the second computing device.

In a variation on this embodiment, the system may compute a second encrypted utility statistic in a two-stream mode, and send the second encrypted utility statistic to the second computing device.

In a further variation, the system may re-encrypt the decrypted utility statistic based on a first single-use key to obtain a re-encrypted utility statistic. The system may send the re-encrypted utility statistic to the second computing device. The system may receive a second re-encrypted utility statistic value and a second single-use key from the second computing device. The system may then send the first single-use key to the second computing device. The system may decrypt the second re-encrypted utility statistic based on the second single-use key to obtain a second utility statistic, and determine that the second utility statistic is equal to the decrypted utility statistic.

In a variation on this embodiment, the second computing device applies a statistical privacy technique to a set of data to obtain a second set of data to be considered for sharing/combining.

In a variation on this embodiment, the second computing device performs operations comprising computing the encrypted value based on the set of encrypted class labels and the public key.

In a variation on this embodiment, the second computing device performs at least one of a binary operation associated with an additively homomorphic private key encryption scheme, and a binary operation associated with a scalar multiplication homomorphic private key encryption scheme.

Another embodiment described herein includes a non-transitory computer-readable storage medium storing instructions which when executed by a computing system with multiple computing devices cause the system to perform a method for securely estimating the utility of combining data from two or more parties. During operation of the method, the system may exchange, in multiple rounds, encrypted data and encrypted statistics computed for the data. A statistic is a measure derived from one or more attributes of the data. The system may build an encrypted utility statistic using computations in an encrypted domain without sharing private decryption keys. One or more parties may then apply a respective private decryption key to decrypt the encrypted utility statistic to obtain a utility statistic.

Another embodiment described herein includes a non-transitory computer-readable storage medium storing instructions which when executed by a computing system (e.g., computer) cause the system to perform a method for obtaining a utility statistic. During operation of the method, the system may encrypt a set of class labels based on a public key/private key pair to obtain a set of encrypted class labels. The system may send a public key and the set of encrypted class labels to a second computing device. The system may receive an encrypted value computed by the second computing device based on the public key. The system may decrypt the encrypted value based on a private key to obtain a decrypted value. The system may then send a pair of encrypted values computed based on the decrypted value to the second computing device. The system may subsequently receive an encrypted utility statistic from the second computing device, and decrypt the encrypted utility statistic to obtain a decrypted utility statistic.

Another embodiment described herein includes a system for performing a protocol to facilitate generating a utility statistic. During operation, the system (e.g. a server) may receive requests to establish network connections with two computing devices. The system may set up the network connections and may assign a session ID. The system may send the session ID to the two computing devices. The system may receive data from a first computing device with the session ID, and send the data to a second computing device with a notification to perform a next round of the protocol.

In a variation of this embodiment, the system may receive data from the second computing device with the session ID, and send the data to the first computing device with a second notification to perform the next round of the protocol.

Another embodiment disclosed herein includes a non-transitory computer-readable storage medium storing instructions that when executed by a computer cause the computer to perform a method to facilitate generating a utility statistic. During operation of the method, the computer may receive requests to establish network connections with two computing devices. The computer may set up the network connections and may assign a session ID. The computer may send the session ID to the two computing devices. The computer may receive data from a first computing device with the session ID, and send the data to a second computing device with a notification to perform a next round of the protocol.

BRIEF DESCRIPTION OF THE FIGURES

In the figures, like reference numerals refer to the same figure elements.

DETAILED DESCRIPTION

Figure 1:
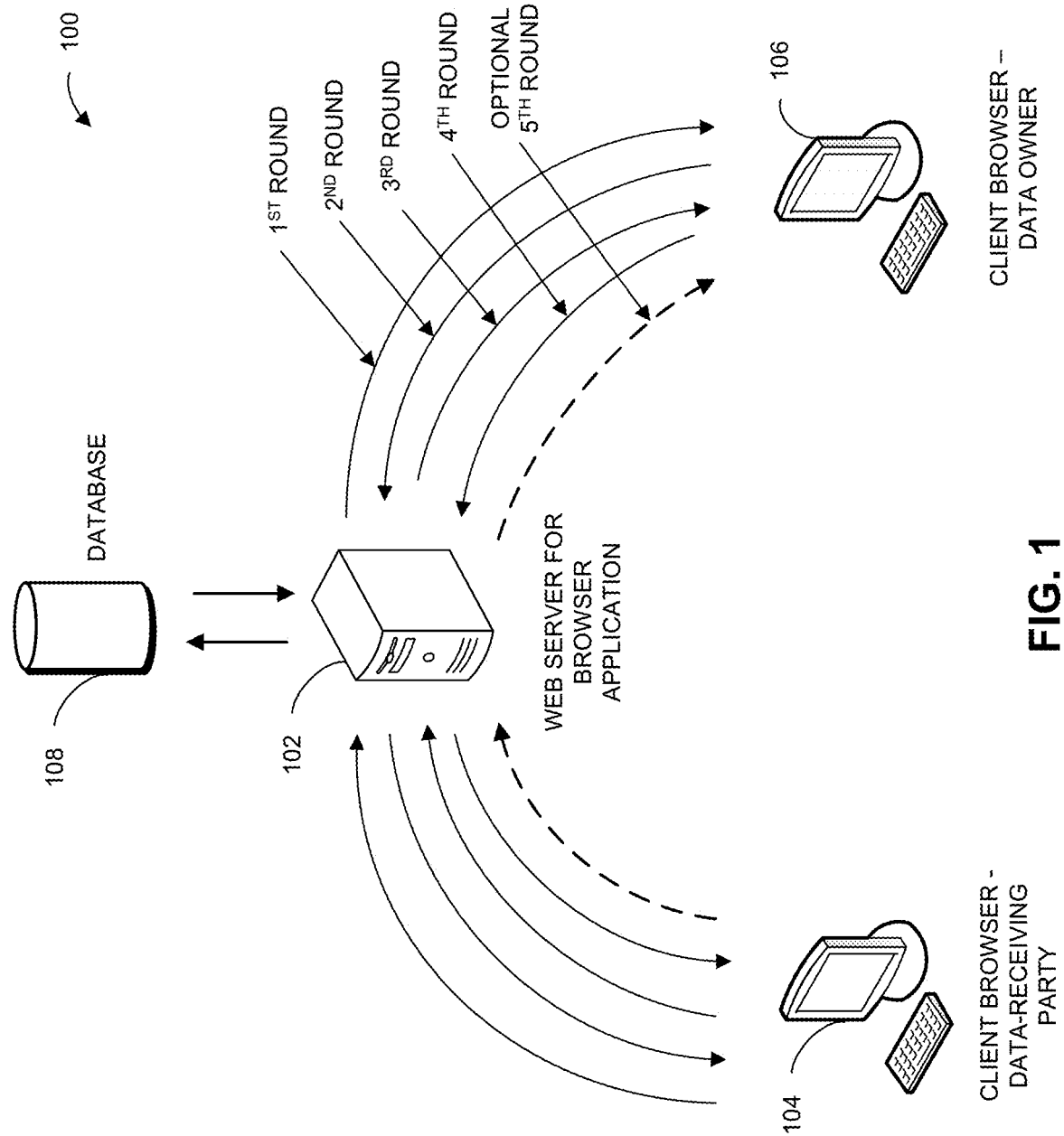
FIG. 1 presents a block diagram illustrating an exemplary system for performing a protocol to compute a chi-square value and enhance a classifier, in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments described herein solve the problem of improving a classifier by introducing a protocol which two computing systems may perform to securely compute a statistic that quantifies the utility of feature data. The statistic indicates the likelihood that feature data from one of the computing systems is useful for improving the classifier of the other computing system. In some embodiments, the statistic is a $\chi^2$ value. Furthermore, in embodiments the computing devices may perform the $\chi^2$ computations using encrypted data, thereby preserving the privacy of the data. Note that the $\chi^2$ value may also be referred to as a chi-square value.

The disclosure below describes an efficient protocol for securely computing utility of features in a binary classification problem without revealing the feature data. The protocol does not require a trusted third party intermediary, as the parties performing the protocol securely encrypt results of calculations using their data and do not give out the decryption key. Specifically, this disclosure presents a four-round protocol between two parties. For example, the two parties may be a data owner of a feature vector and another party (e.g., a data-receiving party) that may potentially obtain the feature vector. The data owner may have a binary feature vector and the data-receiving party may have a binary class vector, and the data-receiving party would like to learn if the data owner's feature vector can improve the correctness of his classification. The utility being considered is whether the data shared by the data owner is expected to improve the classification of the data-receiving party's existing dataset. The data owner and data-receiving party may determine the value of the data with respect to the data-receiving party's task at hand.

The protocol reveals a utility measure for using the feature vector to improve the data-receiving party's classifier, without revealing the feature vector itself to the potential data-receiving party. The protocol also does not reveal the data-receiving party's data to the data owner. The two parties may securely measure utility of data for improving a classifier without access to the actual data. The potential recipient of data does not learn anything more about the data other than its specification in a shared data dictionary. The embodiments described herein may utilize Pallier homomorphic encryption for privacy-preserving computations. The protocol has provable security against honest-but-curious adversaries.

The disclosure and examples disclosed herein may involve a structure dataset with classification based on all the features available. Specifically, the examples may include two parties, Carol and Felix. Carol may have a dataset which includes certain features and a class vector generated according to the available features $f^{(1)}, \ldots, f^{(t)}$, where $f^{(j)}$ is a feature vector. Felix may possess a feature column f that may be useful for Carol in improving the classification. Note that the parties may share a common index key for the feature vector and the class vector.

Notations. Let $c=(c_1, c_2, \ldots, c_n)$ be the class label vector with Carol, and $f=(f_1, f_2, \ldots, f_n)$ be the feature vector with Felix. In some embodiments, both the class labels and the features are binary attributes. That is, for all $1 \leq i \leq n$, $c_i \in \{0, 1\}$ and $f_i \in \{0, 1\}$. Let $c_i$ denote the class variable of the i-th record in Carol's dataset. Let $f_i$ be the feature value, in Felix's feature vector, corresponding to the i-th record in Carol's dataset.

$\chi^2$ Feature Selection

Feature selection is the process of removing non-informative features and selecting a subset of features that are useful to build a good predictor. The criteria for feature selection may vary among applications. For example, Pearson correlation coefficients are often used to detect dependencies in linear regressions, and mutual information is commonly used to rank discrete or nominal features.

This disclosure focuses on determining utility of binary features. In some embodiments, a system may use $\chi^2$ statistics as a measure of utility, due to its wide applicability and its amenability towards cryptographic tools. More specifically, unlike mutual information which involves logarithmic computations, the calculation of $\chi^2$ statistics only involves additions and multiplications, which are more amenable towards cryptographic tools. Various embodiments may also use a utility measure that is different from the $\chi^2$ statistic, and may break a multiclass classifier down into a series of binary classifiers and then use the disclosed protocol/methods.

Consider a class label vector c and the corresponding feature vector f. A is the number of rows with $f_i=0$ and $c_i=0$. B is the number of rows with $f_i=0$ and $c_i=1$. C is the number of rows with $f_i=1$ and $c_i=0$. D is the number of rows with $f_i=1$ and $c_i=1$. Table 1 shows the two-way contingency table of f and c. The $\chi^2$ statistic of f and c may be defined to be:

$$\chi^2(f, c) = \frac{n(AD - BC)^2}{(A+C)(A+B)(C+D)(B+D)}$$

TABLE 1

Two-Way Contingency Table of f and c

| f | c 0 | 1 |
|---|---|---|
| 0 | A | B |
| 1 | C | D |

The system may use $\chi^2(f, c)$ to test the independence of f and c. Table 2 shows the confidence of rejecting the independence hypothesis under different $\chi^2$ values. For example, when $\chi^2(f, c)$ is larger than 10.83, the independence hypothesis can be rejected with more than 99.9% confidence, indicating that the feature vector f is very likely to be correlated with the class label vector c.

TABLE 2

Confidence of Rejecting the Hypothesis of Independence under Different $\chi^2$ Values

| $\chi^2$(f, c) | Confidence |
|---|---|
| 10.83 | 99.9% |
| 7.88 | 99.5% |
| 6.63 | 99% |
| 3.84 | 95% |
| 2.71 | 90% |

Cryptographic Tools

PKE scheme and CPA security. Below are descriptions of the standard definitions of public-key encryption (PKE) scheme and chosen plaintext attack (CPA) security, which are used in this disclosure.

PKE schemes. A scheme PKE with message space M may include three probabilistically-polynomial-time (PPT) techniques Gen, Enc, Dec. Key generation technique Gen($1^k$) outputs a public key pk and a secret key sk. Encryption technique Enc(pk, m) takes pk and a message m∈M, and outputs a ciphertext c. Decryption technique Dec(sk, c) takes sk and a ciphertext c, and outputs a message m. For correctness, some embodiments may require that $Dec(sk, c)=m$ for all $(pk, sk) \leftarrow Gen(1^k)$, all $c\ Enc(pk, m)$, and all $m \in M$.

Negligible Function. A function $f: \mathbb{N} \to \mathbb{R}$ is negligible if for every possible integer c, there exists an integer N such that for all $x > N$, $$|f(x)| \leq \frac{1}{x^c}.$$

Negligible functions may be denoted by $negl(\cdot)$.

The CPA Experiment. The chosen-plaintext attack (CPA) game with an adversary A against a PKE scheme PKE is described below.

---
Technique 1 The $PubK_{A,PKE}^{CPA}$ Experiment
---

Input: Security parameter k
1: $(pk, sk) \leftarrow Gen(1^k)$
2: The adversary A is given $1^k$, pk, and oracle access to $Enc_{pk}(\cdot)$.
A outputs a pair of messages $(m_0, m_1)$ of the same length
3: A uniform bit $b \in \{0, 1\}$ is chosen and $c \leftarrow Enc_{pk}(m_b)$ is given to A
4: A continue to have access to $Enc_{pk}(\cdot)$, and outputs a bit b'
Output: 1 if b' = b, and 0 otherwise CPA Security. A PKE scheme PKE=(Gen, Enc, Dec) has indistinguishable encryptions under a chosen-plaintext attack, or is CPA-secure, if for all probabilistic polynomial-time adversaries A there is a negligible function negl such that $$Pr[PubK_{A,PKE}^{CPA}(k)=1] \leq \frac{1}{2}+negl(k),$$

where the experiment $PubK_{A,PKE}^{CPA}$ is defined in Technique 1, and the probability is taken over the randomness of A and of the experiment.

Paillier Encryption Scheme. Let Gen Modulus be a polynomial-time technique, that, on input $1^k$, outputs (N, p, q) where N=pq and p and q are k-bit primes (except p or q is not prime with probability negligible in k). Define the following encryption scheme:

Gen: on input $1^k$ run GenModulus $(1^k)$ to obtain (N, p, q). The public key is pk=N, and the private key is sk= $\langle N, \phi(N) \rangle$.

Enc: on input a public key N and a message $m \in \mathbb{Z}_N$, choose a uniform $r \leftarrow \mathbb{Z}_N^*$ and output the ciphertext $$c:=[(1+N)^m \cdot r^N \mod N^2].$$

Dec: on input a private key $\langle N, \phi(N) \rangle$ and a ciphertext c, compute $$m := \left[\frac{[c^{\phi(N)} \mod N^2] - 1}{N} \cdot \phi(N)^{-1} \mod N\right].$$

Paillier Encryption. This disclosure uses the Paillier encryption scheme to maintain privacy in the two-party feature selection technique, and employs the additive homomorphic property of Paillier encryption to calculate the $\chi^2$ statistics. Paillier encryption scheme supports additive homomorphism and scalar multiplication. Below are the definitions of additive homomorphism and scalar multiplication homomorphism. Embodiments are not limited to the Paillier encryption scheme and various embodiments may also utilize other encryption schemes.

Additive Homomorphism. A PKE scheme PKE=(Gen, Enc, Dec) is said to be additively homomorphic, if there exists a binary operation $\oplus$, such that the following holds for all $k \in \mathbb{N}$, and for all $m_1, m_2 \in M$, $$Pr\left[m^* = m_1 + m_2 \middle| \begin{array}{c} (pk, sk) \leftarrow Gen(1^k) \\ c_1 \leftarrow Enc_{pk}(m_1), c_2 \leftarrow Enc_{pk}(m_2) \\ c^* \leftarrow c_1 \oplus c_2 \\ m^* \leftarrow Dec_{sk}(c^*) \end{array}\right] = 1 - negl(k).$$

Scalar Multiplication Homomorphism. A PKE scheme PKE=(Gen, Enc, Dec) is said to be scalar multiplication homomorphic, if there exists a binary operation $\otimes$, such that the following holds for all $k \in \mathbb{N}$, and for all $m_1, m_2 \in M$, $$Pr\left[m^* = m_1 + m_2 \middle| \begin{array}{c} (pk, sk) \leftarrow Gen(1^k) \\ c \leftarrow Enc_{pk}(m_2) \\ c^* \leftarrow m_1 \oplus c \\ m^* \leftarrow Dec_{sk}(c^*) \end{array}\right] = 1 - negl(k).$$

Exemplary System for Improving Classifiers

FIG. 1 presents a block diagram illustrating an exemplary system for performing a protocol to compute a chi-square value and enhance a classifier, in accordance with an embodiment. FIG. 1 depicts a system 100 that two parties may use to perform the rounds of the protocol computation. A web server 102 may communicate with client computers 104, 106 over a communication network. web server 102 may manage the protocol for computing $\chi^2$ using web services. Client computers 104, 106 may include browsers that access the web server. The client computers may perform encryption computations. Two parties may open browser sessions, connect to web server 102, and agree they want to assess the utility of sharing data according to the protocol. Web server 102 may assign a session ID and share the session ID with both users. The web services may store and use the session ID in a database to keep track of the progress of the protocol rounds.

The party responsible for performing round one (e.g., client computer 104) may perform the computations and submit the result to the web server along with the session ID, e.g. using a HTTPS POST command. The web server may store the result in a database 108 and transmit the result to the other party, along with a notification that the next round of the protocol needs to be performed.

The second party (e.g., client computer 106) may perform the round two computations, and then post the result along with the session ID to the web server. As before, the web server may store the result in database 108 and transmit the result to the first party, along with a notification to perform the next round.

Web server 102 may continue to notify a client when there is an output of a round available from the other client. When notified that a round is ready, each party may perform the next round of computations and send the result to web server 102. The process continues until all 4 rounds are complete.

Optionally, a web application may include client-side computation of the rounds, e.g. using JavaScript and web socket tools, so that the user experience is simply giving the browser access to the data and then waiting until all rounds are complete. In this case, the system may notify the users that their data will not be uploaded to the server. In some embodiments, the clients may perform the protocol by communicating directly with each other in a peer-to-peer network, and a web server is not required.

In some embodiments, the classifier may classify security data. The techniques disclosed herein may improve the classifier. For example, the disclosed techniques may improve the classification of network events, such as whether network event are attacks on the network from outsiders or normal network activity. The classifier may also classify user activity, such as user activity in an enterprise, to determine whether users are performing insider attacks on the enterprise or performing normal network user activity.

In some embodiments, the classifier functionality may be implemented in a network router. The router may automatically classify network events and respond to suspicious network events by changing network routing, raising an alarm, or otherwise notifying an administrator. The router may automatically connect with other network devices to trade, receive, or transfer security data and automatically improve the classifier using the techniques described herein.

With the protocol, the parties can determine whether data is likely to improve the classifier, before transmitting data. This may reduce the use of network resources, since the data transfer need not occur if the parties determine that the data would not be likely to improve the classifier. In some scenarios, the data may be a large amount of data that may consume network bandwidth, and therefore it may be beneficial to first determine whether the data is likely to improve the classifier before transmitting the data.

The classifier may also be a rule-based classifier. The system may improve a set of rules of the classifier by adding or changing the rules of the classifier. Using the protocol to obtain data and modifying the rules of the classifier, the system may improve the classifier so that the classifier can perform functions that the classifier was not previously able to perform.

The parties may assess the utility of trading data without hiring a third party, which consumes both time and money and requires the third party to be trusted. Data privacy can be protected against third parties.

With a quick method for computing utility, the parties can efficiently consider more options, such as a provider of data choosing among potential recipients of data, a recipient choosing among potential data providers, and parties selecting among methods of data de-sensitization when needed.

Protocol as Performed by Server

Figure 2A:
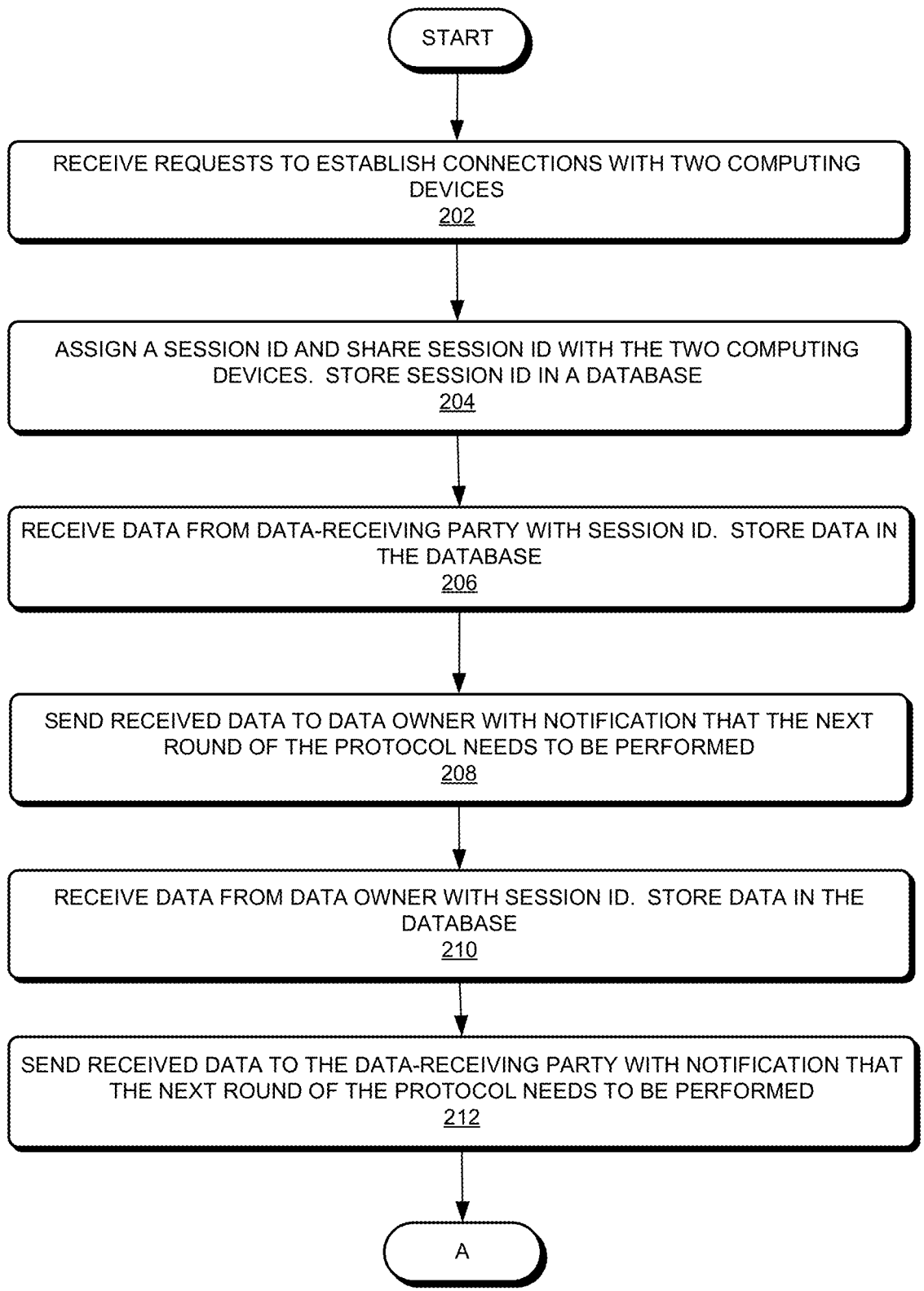
FIG. 2A-2B present a flowchart illustrating an exemplary method for performing the protocol by a server, in accordance with an embodiment.
Figure 2B:
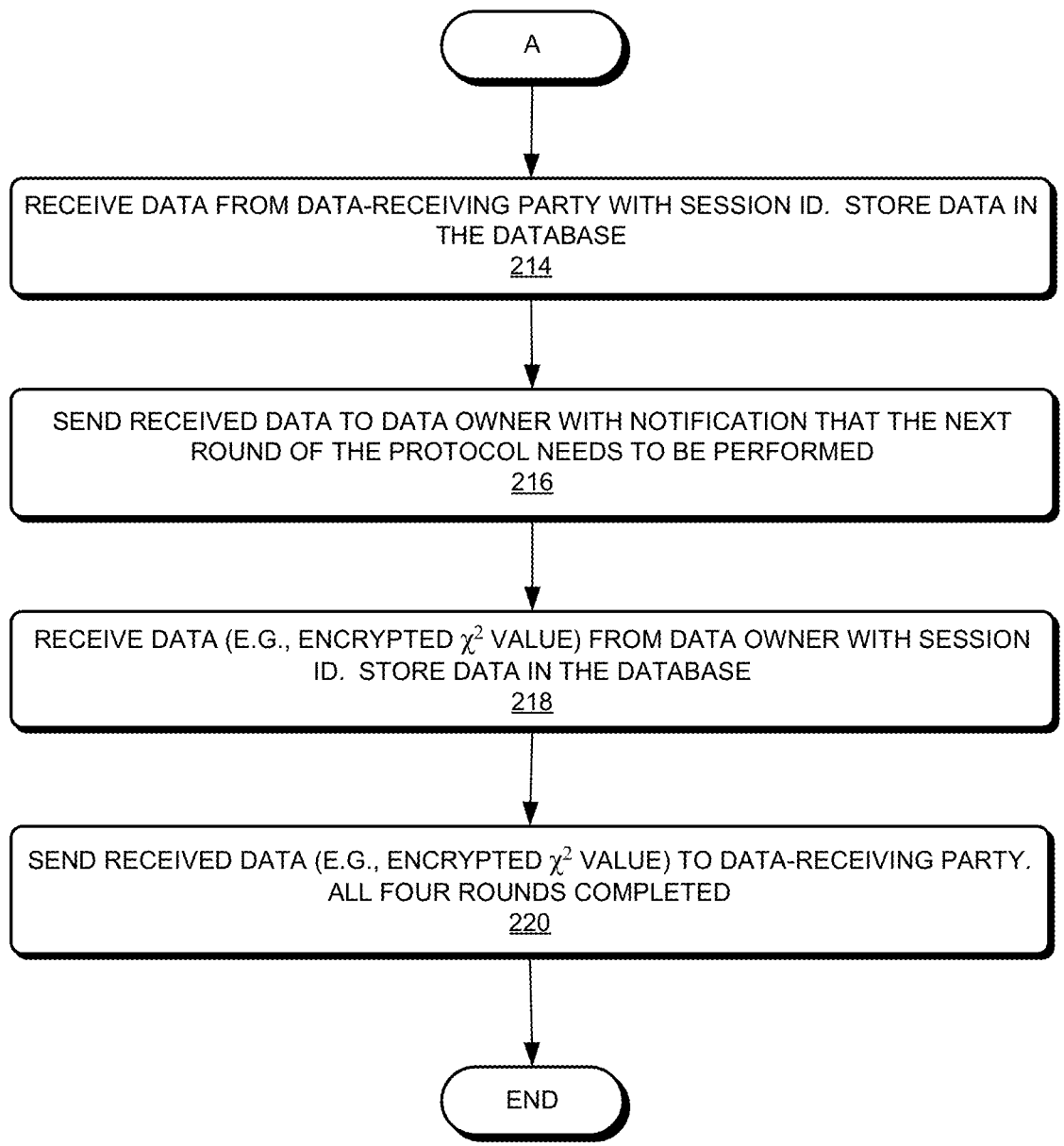

FIG. 2A-2B presents a flowchart illustrating an exemplary method for performing the protocol by a server, in accordance with an embodiment. A server may perform the operations of FIG. 2A-2B. During operation, the server may receive requests to establish connections with two computing devices (operation 202). The server may respond by setting up the connections with the two computing devices. The server may assign a session ID and share the session ID with the two computing devices (operation 204). The server may store the session ID in a database.

The server may then receive data from a data-receiving party with the session ID (operation 206). This data may include an encryption public key and encrypted class label elements of a feature vector, as well as other encrypted data. The server may store the data in the database.

The server may then send the received data to the data owner with notification that the next round of the protocol needs to be performed (operation 208). The server may receive data from the data owner with the session ID. For example, the received data may include $Enc_{pk}(rD)$. The server may store the data in the database (operation 210). The server may subsequently send the received data to the data-receiving party with notification that the next round of the protocol needs to be performed (operation 212).

The server may then receive data from the data-receiving party with the session ID. The server may store the data in the database (operation 214). For example, the data may include a pair of encrypted values $$\left(Enc_{pk}\left(\frac{r^2D^2}{(B+D)(A+C)}\right), Enc_{pk}\left(\frac{rD}{A+C}\right)\right).$$

The server may then send the received data to the data owner with notification that the next round of the protocol needs to be performed (operation 216).

The server may then receive data (e.g., encrypted chi-square value) from the data owner with the session ID (operation 218). The server may store the data in the database. The server may send the received data to the data-receiving party (operation 220). The server and the two computing devices have completed four rounds of the protocol.

EXEMPLARY SCENARIOS

Below are descriptions of different use case scenarios that use the protocol described herein and the system described with respect to FIG. 1.

Example 1

In this example, a data-receiving party is interested in obtaining a column of data from a data owner. The data-receiving party intends to add the data to a data table, in order to improve a classifier trained using that table. The owner is willing to provide the data, but the data-receiving party is not certain that the data will actually improve the classifier. The data-receiving party has access to the data dictionary for the owner's data and they share a common index key, but the data-receiving party does not know the actual values of the data elements. The parties agree to use the protocol, with the data-receiving party performing round one. After following the protocol, the data-receiving party has a value for the $\chi^2$ statistic, which is a measure of the utility of the data the owner is willing to provide. Based on the value of $\chi^2$, along with any other information the data-receiving party considers important, the data-receiving party decides whether to obtain the data. In some scenarios, a data owner may sell the data to the data-receiving party or trade for other data.

Example 2

In this example, the parties agree to follow the protocol, but in two-stream mode. The two-stream mode begins with both parties computing and sending encrypted values in round one and both parties sending encrypted values of $\chi^2$ in round four. Since the computation for $\chi^2$ is symmetric with respect to c and f, both parties should end up with the same value of $\chi^2$, assuming they used the same data in both streams (i.e., did not cheat). For this example, there may be a fifth round in which each party, after decrypting $\chi^2$ with their own secret key, re-encrypts $\chi^2$ with a new, single-use key they generate. This single use key may be a symmetric encryption key. Then each party sends their re-encrypted $\chi^2$ to the other party. Each party may also send the one-use key, but only after receiving the re-encrypted $\chi^2$ message from the other party. They are doing this exchange of re-encrypted $\chi^2$ and the associated single-use key to verify that they are both looking at the same value of $\chi^2$.

Each party can decrypt their re-encrypted $\chi^2$ message with the one-use key from the other party, and verify that the $\chi^2$ decrypted by the other party in round four is the same one they received and decrypted in round four. This extra round assures both parties that they are looking at the same $\chi^2$ value, to eliminate the possibility that one party cheated by using different data in the two encrypted domain computation streams. Without such assurance, a data owner might be concerned that the potential data-receiving party used fake, low utility data for the data owner's $\chi^2$, in order to hide the true value of the data to the data-receiving party. If $\chi^2$ needs to remain secure after this protocol is used, then the single-use keys can be encrypted with the other party's public key before transmitting, so that a third party adversary does not get access to the single use key.

Example 3

In this example, the owner of the data is willing to provide access to a feature column (e.g., by selling, licensing, trading, and/or transferring), but the owner is limiting the number of recipients (e.g., licensees) to a small number n, such as n=5 or n=2. In this example, the owner may want to choose the receiving parties that will get the highest utility out of the data. A data owner and/or data-receiving party may want to limit the number of data recipients (e.g., licensees) to minimize the risk to sensitive data (more recipients means more things can go wrong). A data owner and/or data-receiving party may also want to maximize the value to data-receiving parties by guaranteeing to keep the data from their competitors and the public at large. Data is often more valuable and/or useful when access to it is limited. In this example, the parties may agree to follow the protocol, but using the two-stream mode described in the previous example. In some use case scenarios, the data owner may sell access to the feature column to the limited number of recipients that get the highest utility from the data because they are willing to pay a higher price.

In some scenarios, the data owner may establish $\chi^2$ values for potential licensees, and the data owner can choose winning licensees out of that group, honoring any buyer conditions about field of use, maximum number of licensees, not selling to competitors of the buyer, etc. The price may either be pre-set, such as a fixed price or a schedule of price vs. utility, or the parties may negotiate after the winning licensees are selected. Potential licensees will be motivated to not use data in the utility computation protocol that will underestimate the true value, since that could remove them from consideration as a licensee. The data owner is motivated to use data that will yield the best utility numbers because that will show their data to be more valuable. Therefore, both parties have something to gain by not 'gaming' the utility computation protocol.

Example 4

In this example, the owner of the data is willing to provide access to a feature column (e.g., by giving or selling access), but the owner needs to apply statistical privacy to the data to protect sensitive information. There are many different statistical privacy methods, so the owner and data-receiving party may want to choose a method (and corresponding method parameters and settings) that provides an acceptable tradeoff between security and utility. In this example, the parties may agree to follow the protocol, but using the two-stream mode described in Example 2 to help the data owner manage considerations among multiple data recipients. They may compute $\chi^2$ values for a set of statistical privacy alternatives, spanning a set of methods, parameter values and settings of mutual interest. There are a number of tools for the data owner to use for applying statistical privacy to the data, such as ARX, an open source data anonymization tool. ARX is open source software for anonymizing sensitive personal data. Based on the results, the data owner may communicate which methods and parameter values provide acceptable security, and the potential data-receiving party may communicate which choices provide acceptable utility. They may then come to an agreement on the method to use, and the data owner may apply that method and provide the data-receiving party with the privatized data. Examples of statistical privacy methods and their parameters are given in Table 3 below.

TABLE 3

Examples of Statistical Privacy Methods and Their Parameters

| Statistical privacy method | Parameters & settings (ranges in square brackets) |
| --- | --- |
| ε-δ Differential privacy | ε, δ, generalization level |
| k-Anonymity | K |
| k-Map | K, estimator type(Poisson, zero-truncated Poisson, none), significance level of estimator |
| δ-presence | $\delta_{min}$, $\delta_{max}$ |
| Average re-identification risk | threshold |
| Population uniqueness | Threshold, model (Dankar, Pitman, Zayatz, SNB) |
| Sample uniqueness | threshold |

Example 5

In this example, the owner of the data is willing to provide access to subsets of a feature column, but does not want to give access to the full set of data to any one recipient, to control proliferation of the data. In this example, the parties agree to follow the protocol, but using the two-stream mode described in Example 2 to help the data owner manage considerations among multiple data recipients. They compute $\chi^2$ values for different subsets of the data that the owner is willing to release (or license). They then come to an agreement on which subset to release (or license). As an option, if the owner needs to apply statistical privacy to the subset before releasing it, the parties can follow the process in example 4 to choose a statistical privacy method.

Two-Stream Versions

Example 6

For two-stream cases like those in previous examples, both parties may complete each round, and a fifth round may be added as described in Example 2. When web server 102 sets up the session for the two parties, web server 102 may store data in the database indicating that the session is performed with a two-stream method.

In some embodiments, the web application performs the client-side computations, e.g. with JavaScript or similar code executed on the client computer, so the users do not have to manually execute each round outside of the web application. In this embodiment, the user experience is to load the data once into the client-side environment, and wait for the final result. To the user, the web application handles computing any necessary information, sending encrypted results, and listening for when a new result from the other party is ready. Since the computations are performed at the clients, the data of each party remains secure from the other parties and the web server itself.

In some embodiments, a system has a central server with documented application programming interfaces (APIs) that allow client systems to programmatically initiate and validate a session with a second party, deliver results of rounds of computations, and receive notifications and/or check on status when waiting for results from the other party. Custom or third-party client-side software can then use these APIs directly, as an alternative to a browser-based approach.

The web server may maintain a database for each session, recording when a round is initiated and when a result for that round is returned. This allows the web services to perform actions like sending reminders to complete a transaction, identify if a round is being performed more than once and get clarification if that is intentional, and optionally store the encrypted data exchanged in each round. The web services may also finalize the exchange of information when the rounds have been completed.

In some embodiments, the web services may include a marketplace where owners of data could post data they have available (e.g., for possible licensing, trading, or otherwise providing the data), with a data dictionary or equivalent. Others that want to obtain the data (e.g., purchase a license to the data or trade data) may post their requests, or search what is being offered. For example, different parties may trade security-related data in order to improve their classifiers, thereby improving classification and detection of security events in a computer network. The parties' computing devices may automatically perform computations and obtain security-related data from each other in order to improve their classifiers. This is more efficient than traditional approaches to generating classifiers. The web services may also offer authentication of user identities, through data collected from users when they request an account.

Example 7

In this example, a party may sell a license to the data by (e.g., electronic) auction. Before the auction, potential bidders may follow the protocol, with the potential bidder performing round one. After round four, the potential bidder has a value of $\chi^2$ for her classifier application. The number of potential bidders and the number of different $\chi^2$ evaluations can be limited by the auctioneer. This minimizes the risk of an adversary performing multiple $\chi^2$ evaluations for the purpose of reverse engineering information about the data that is not meant to be public. The auction can be a conventional "English" auction, a Dutch auction, a Vickrey auction, or another type of auction. Some embodiments may include a web-based auction system, expanding on the web services described in Example 6.

The disclosure below describes a four-round protocol for $\chi^2$ statistic calculation under a two-party setting. In the examples, one party is named Carol and has a feature vector c. The other party is Felix, who has the feature vector f. Carol's objective is to learn $\chi^2(f, c)$ and Felix's objective is to not reveal any further information about f. In some embodiments, both the class labels of c and the features of f are binary attributes. That is, for all $1 \leq i \leq n$, $c_i \in \{0, 1\}$ and $f_i \in \{0, 1\}$. A is the number of rows with $f_i=0$ and $c_i=0$. B is the number of rows with $f_i=0$ and $c_i=1$. C is the number of rows with $f_i=1$ and $c_i=0$. D is the number of rows with $f_i=1$ and $c_i=1$.

Protocol

Round One

Figure 3:
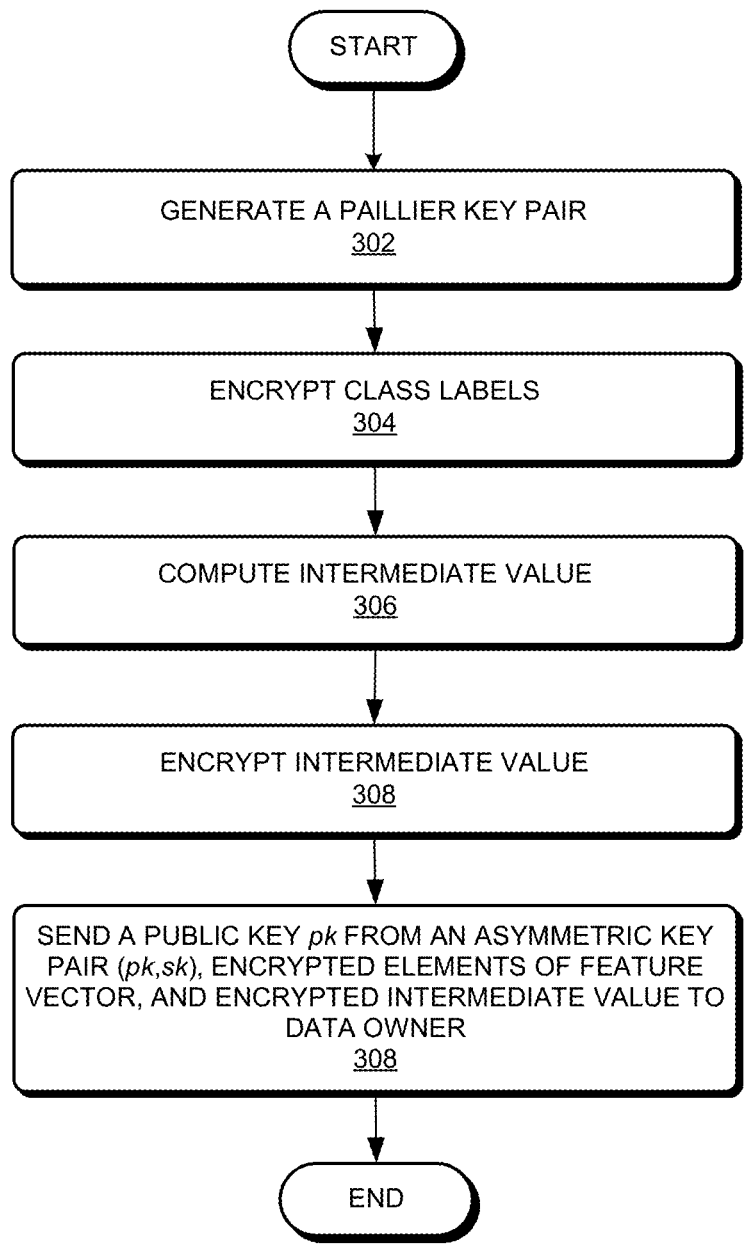
FIG. 3 illustrates a flowchart illustrating an exemplary method for performing round one of the protocol by a data-receiving party, in accordance with an embodiment.

FIG. 3 illustrates a flowchart illustrating an exemplary method for performing round one of the protocol by a data-receiving party, in accordance with an embodiment. The data-receiving party Carol may perform the operations of FIG. 3. During operation, the data-receiving party may perform the computations described below.

1. Generate a Paillier key pair $(pk, sk)=Gen(1^k)$ (operation 302).
2. Encrypt all class labels with pk: $EnC_{pk}(c_1)$, $EnC_{pk}(c_2)$, ..., $Enc_{pk}(c_n)$ (operation 304).
3. Compute intermediate value $$\frac{B+D}{A+C}.$$

Note that Carol can obtain this value by computing $$\frac{\sum_{i=1}^{n} c_i}{n - \sum_{i=1}^{n} c_i},$$

since $B+D=\sum_{i=1}^{n} c_i$ and $A+C=n-(B+D)$, based on the contingency table (operation 306).

4. Encrypt intermediate value $$\frac{B+D}{A+C}$$

with pk:

$$Enc_{pk}\left(\frac{B+D}{A+C}\right)$$

(operation 308).

5. Send public key pk from the asymmetric key pair (pk,sk), encrypted elements of feature vector, and encrypted intermediate value to data owner Felix:

$$\left(pk, Enc_{pk}(c_1), Enc_{pk}(c_2), \ldots, Enc_{pk}(c_n), Enc_{pk}\left(\frac{B+D}{A+C}\right)\right)$$

(operation 310).

Round Two

Figure 4:
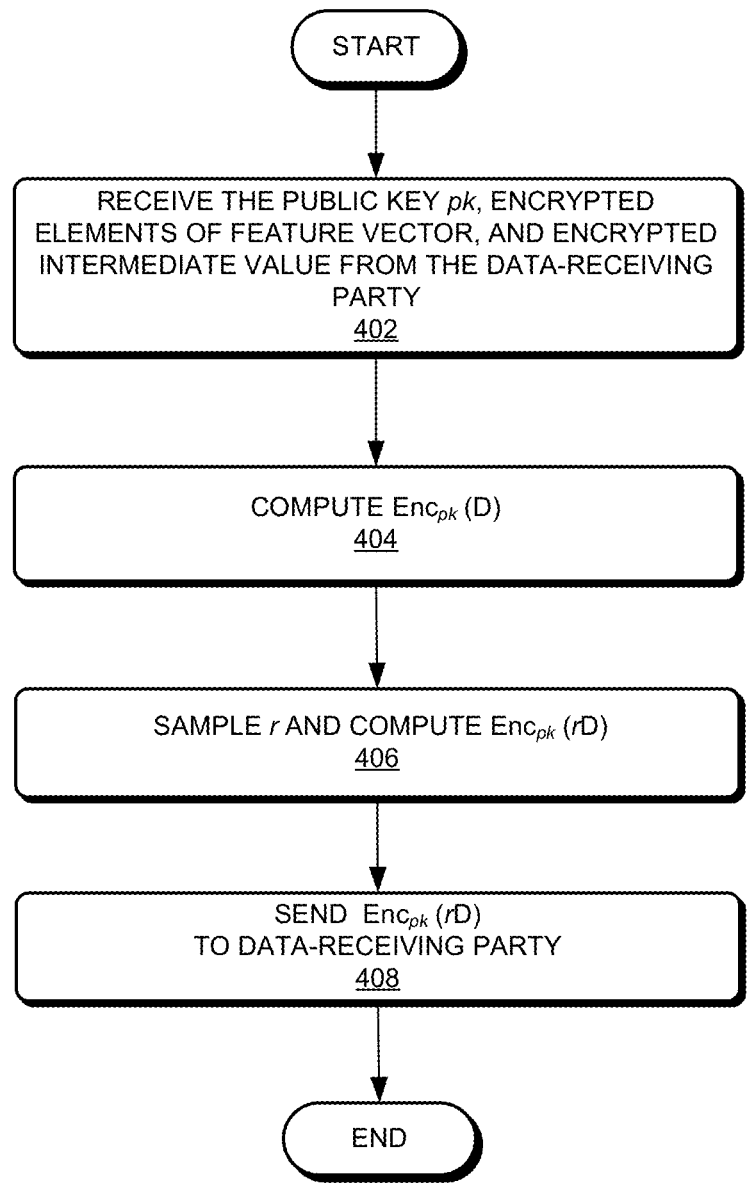
FIG. 4 illustrates a flowchart illustrating an exemplary method for performing round two of the protocol by a data owner, in accordance with an embodiment.

FIG. 4 illustrates a flowchart illustrating an exemplary method for performing round two of the protocol by a data owner, in accordance with an embodiment. The data owner (Felix) may perform the operations of FIG. 4.

During operation, the data owner may receive the public key pk and encrypted data (e.g., encrypted elements of feature vector, and encrypted intermediate value) from the data-receiving party Carol (operation 402).

The data owner may perform the computations as described below.
1. Compute $Enc_{pk}(D)$ (operation 404).
The data owner may obtain this value by computing $$\oplus_{i=1}^{n}(f_i \otimes Enc_{pk}(c_i)) = \oplus_{i=1}^{n} Enc_{pk}(f_i c_i) = Enc_{pk}(\Sigma_{i=1}^{n} f_i c_i),$$

since $\Sigma_{i=1}^{n} f_i c_i = D$.

2. Sample $r \leftarrow \mathbb{Z}_N$, and compute $r \otimes Enc_{pk}(D) = Enc_{pk}(rD)$ (operation 406).
3. Send the following value to the data-receiving party Carol: $Enc_{pk}(rD)$ (operation 408).

Round Three

Figure 5:
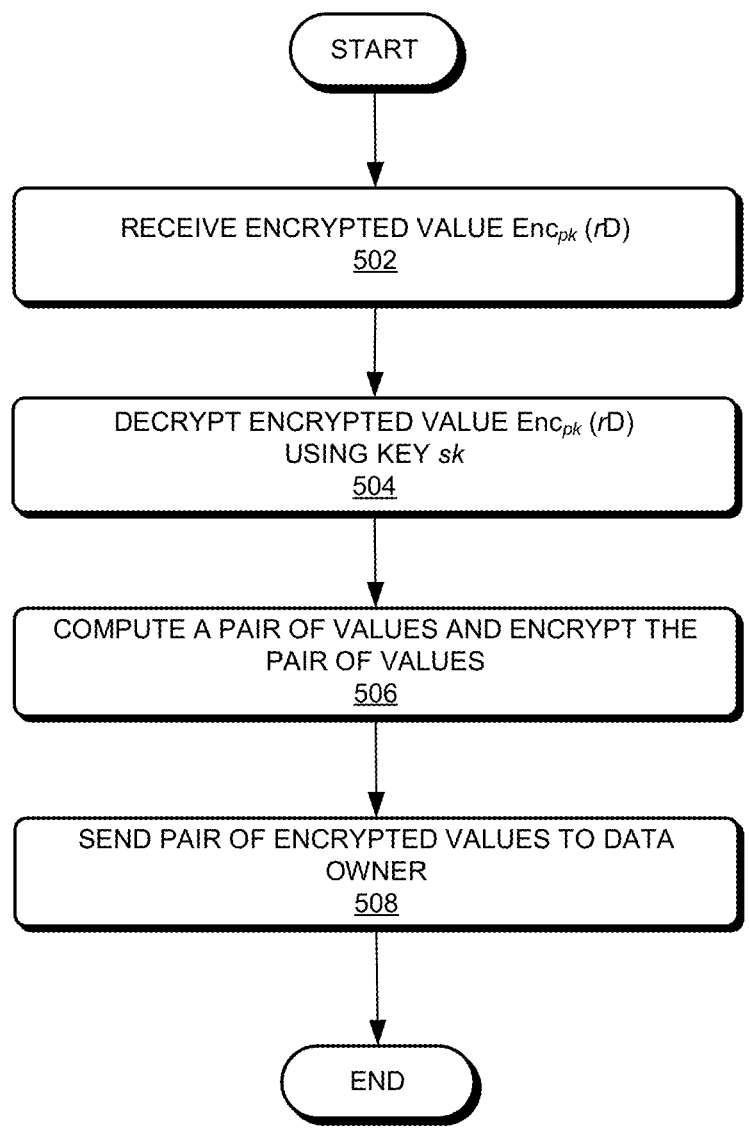
FIG. 5 presents a flowchart illustrating an exemplary method for performing round three of the protocol by a data-receiving party, in accordance with an embodiment.

FIG. 5 presents a flowchart illustrating an exemplary method for performing round three of the protocol by a data-receiving party, in accordance with an embodiment. Data-receiving party Carol may perform the operations of FIG. 5. During operation, the data-receiving party may receive an encrypted value $Enc_{pk}(rD)$ (operation 502).

The data-receiving party may perform the following computations.
1. Decrypt $Enc_{pk}(rD)$ using sk (operation 504).
2. Compute a pair of values $$\frac{r^2 D^2}{(B+D)(A+C)} \text{ and } \frac{rD}{A+C},$$

and encrypt them (operation 506):

$$Enc_{pk}\left(\frac{r^2 D^2}{(B+D)(A+C)}\right) \text{ and } Enc_{pk}\left(\frac{rD}{A+C}\right).$$

3. Send the following pair of encrypted values to data owner Felix (operation 508):

$$\left(Enc_{pk}\left(\frac{r^2 D^2}{(B+D)(A+C)}\right), Enc_{pk}\left(\frac{rD}{A+C}\right)\right).$$

Round Four

Figure 6:
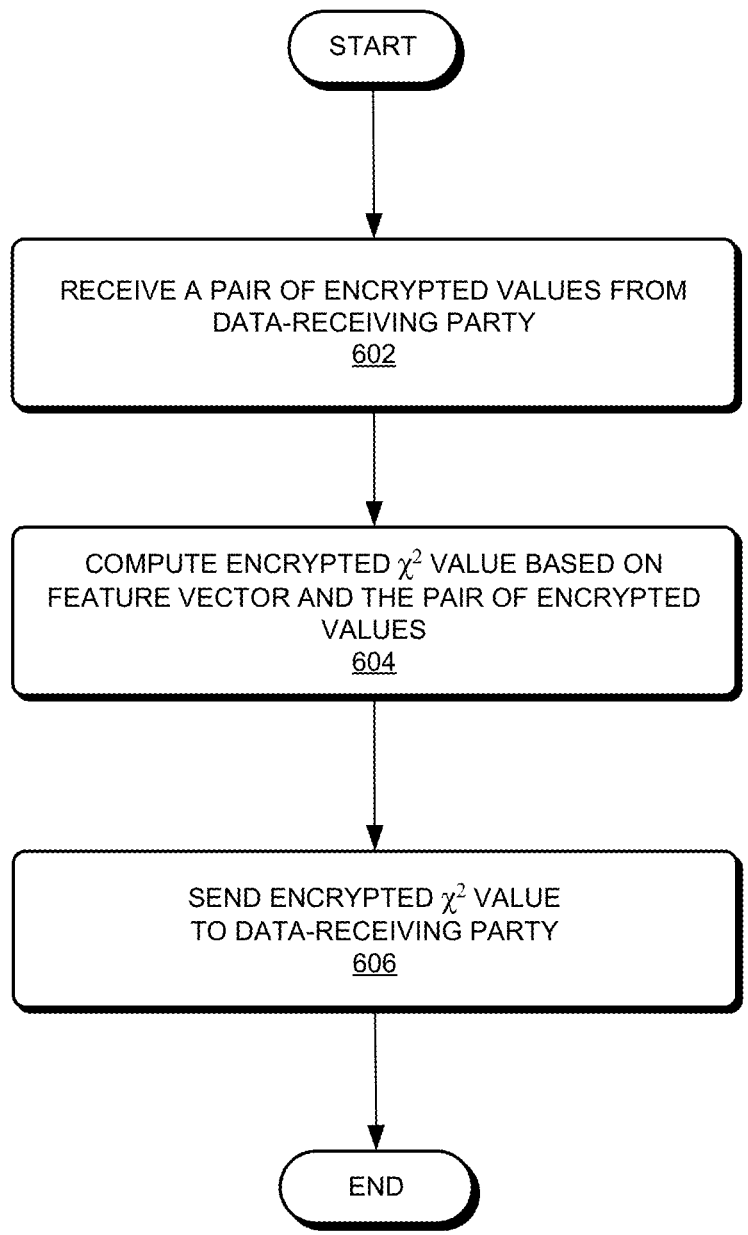
FIG. 6 presents a flowchart illustrating an exemplary method for performing round four of the protocol by a data owner, in accordance with an embodiment.

FIG. 6 presents a flowchart illustrating an exemplary method for performing round four of the protocol by a data owner, in accordance with an embodiment. During operation, data owner Felix may receive a pair of encrypted values from the data-receiving party (operation 602). Data owner Felix may compute an encrypted $\chi^2$ value based on a feature vector f and the pair of encrypted values (operation 604).

Data owner Felix may perform the following computations.
1. Cancel r by computing $$r^{-2} \otimes Enc_{pk}\left(\frac{r^2 D^2}{(B+D)(A+C)}\right) = Enc_{pk}\left(\frac{D^2}{(B+D)(A+C)}\right)$$

and $$r^{-1} \otimes Enc_{pk}\left(\frac{rD}{A+C}\right) = Enc_{pk}\left(\frac{D}{A+C}\right).$$

2. Compute an encryption of $\chi^2(f, c)$ by computing:

$$\left(\frac{n^3}{(A+B)(C+D)} \otimes Enc_{pk}\left(\frac{D^2}{(B+D)(A+C)}\right)\right) \oplus$$
$$\left(\frac{n(C+D)}{A+B} \otimes Enc_{pk}\left(\frac{B+D}{A+C}\right)\right) \oplus \left(\frac{-2n^2}{A+B} \otimes Enc_{pk}\left(\frac{D}{A+C}\right)\right),$$

where C+D and A+B are computed as $$C+D = \Sigma_{i=1}^{n} f_i,$$

and $$A+B = n-(C+D).$$

As shown below the above computation gives $Enc_{pk}(\chi^2(f, c))$.

Since $AD-BC=(A+B+C+D)D-(B+D)(C+D)$, $\chi^2(f, c)$ can be decomposed as follows:

$$\chi^2(f, c) = \frac{n(AD-BC)^2}{(A+C)(A+B)(C+D)(B+D)}$$
$$= \frac{n^3}{(A+B)(C+D)} \frac{D^2}{(B+D)(A+C)} +$$
$$\frac{n(C+D)}{(A+B)} \frac{(B+D)}{(A+C)} - \frac{2n^2}{(A+B)} \frac{D}{(A+C)}.$$

3. Send the following value to Carol (operation 606):

$Enc_{pk}(\chi^2(f,c))$

Alternative Protocol

In some embodiments, the system may use additive blinding rather than multiplicative blinding to introduce the random number r in round two, taking advantage of additive rather than multiplicative homomorphism. For these embodiments, the system may perform round one as described above and round two to round four as described below.

Round Two

Figure 7:
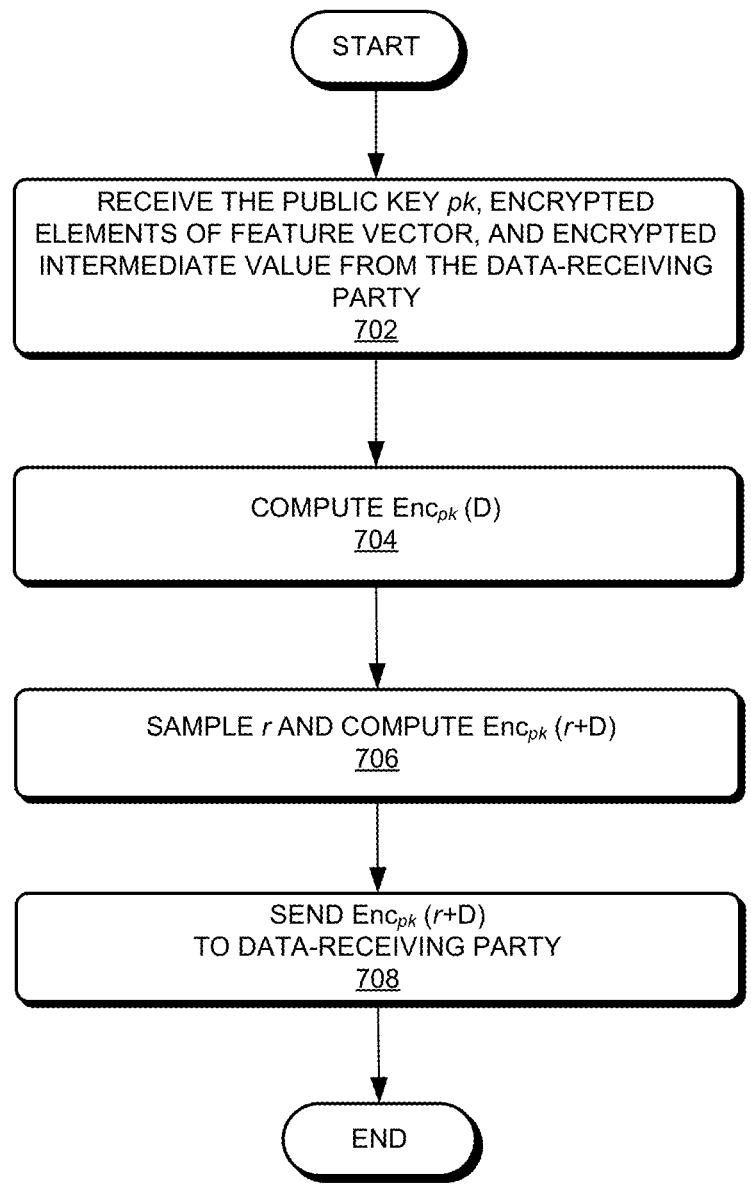
FIG. 7 illustrates a flowchart illustrating an exemplary method for performing round two of an alternative protocol by a data owner, in accordance with an embodiment.

FIG. 7 illustrates a flowchart illustrating an exemplary method for performing round two of an alternative protocol by a data owner, in accordance with an embodiment. The data owner (Felix) may perform the operations of FIG. 7.

During operation, the data owner may receive the public key pk and encrypted data (e.g., encrypted elements of feature vector, and encrypted intermediate value) from the data-receiving party Carol (operation 702).

The data owner may perform the computations as described below.
1. Compute $Enc_{pk}(D)$ (operation 704).
The data owner may obtain this value by computing $$\oplus_{i=1}^{n}(f_i \otimes Enc_{pk}(c_i)) = \oplus_{i=1}^{n} Enc_{pk}(f_i c_i) = Enc_{pk}(\Sigma_{i=1}^{n} f_i c_i),$$

since $\Sigma_{i=1}^{n} f_i c_i = D$.

2. Sample $r \leftarrow \mathbb{Z}_N$, and compute $r \oplus Enc_{pk}(D) = Enc_{pk}(r+D)$ (operation 706).
3. Send the following value to the data-receiving party Carol: $Enc_{pk}(r+D)$ (operation 708).

Round Three

Figure 8:
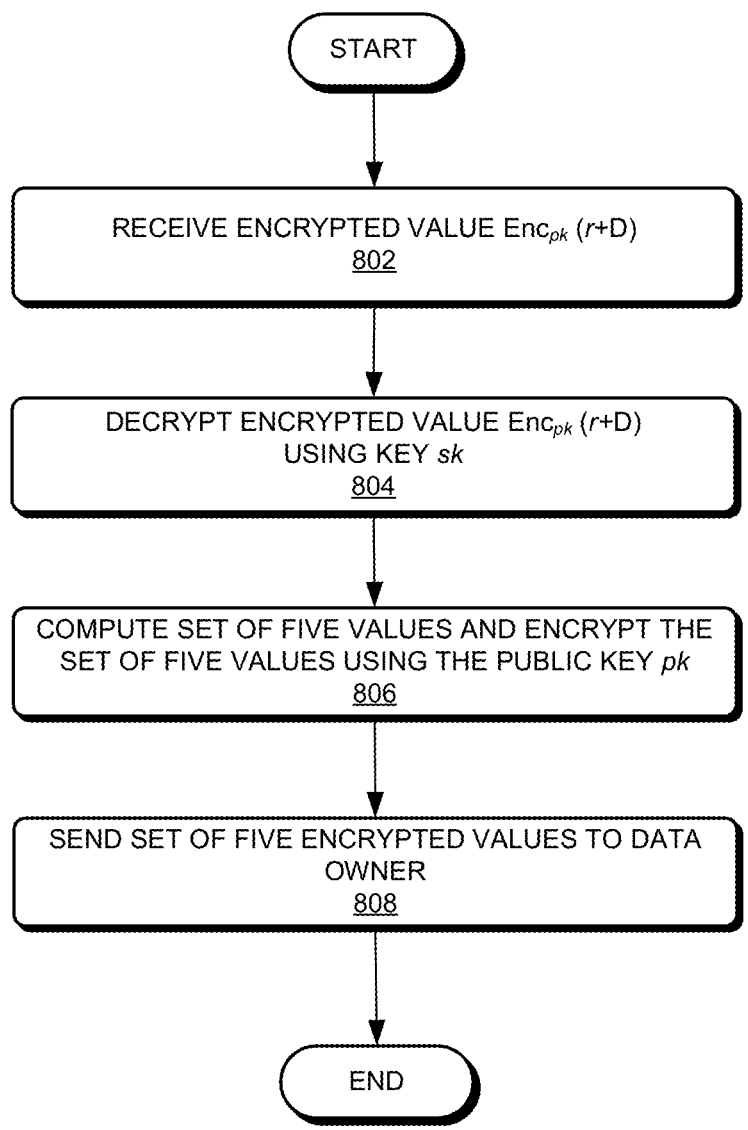
FIG. 8 presents a flowchart illustrating an exemplary method for performing round three of an alternative protocol by a data-receiving party, in accordance with an embodiment.

FIG. 8 presents a flowchart illustrating an exemplary method for performing round three of an alternative protocol by a data-receiving party, in accordance with an embodiment. Data-receiving party Carol may perform the operations of FIG. 8. During operation, the data-receiving party may receive an encrypted value $Enc_{pk}(r+D)$ (operation 802).

The data-receiving party may perform the following computations.

1. Decrypt $Enc_{pk}$ (r+D) using key sk (operation 804).
2. Compute a set of five values $$\frac{(r+D)^2}{(B+D)(A+C)}, \frac{(r+D)}{(B+D)(A+C)}, \frac{(r+D)}{(A+C)}, \frac{1}{(B+D)(A+C)},$$

$$\frac{1}{(A+C)}$$

and encrypt the set of five values using the public key pk (operation 806):

$$Enc_{pk}\left(\frac{(r+D)^2}{(B+D)(A+C)}\right)$$

$$Enc_{pk}\left(\frac{(r+D)}{(A+C)}\right)$$

$$Enc_{pk}\left(\frac{(r+D)}{(B+D)(A+C)}\right)$$

$$Enc_{pk}\left(\frac{1}{(B+D)(A+C)}\right)$$

$$Enc_{pk}\left(\frac{1}{(A+C)}\right)$$

3. Send the set of five encrypted values to data owner Felix (operation 808).

Round Four

Figure 9:
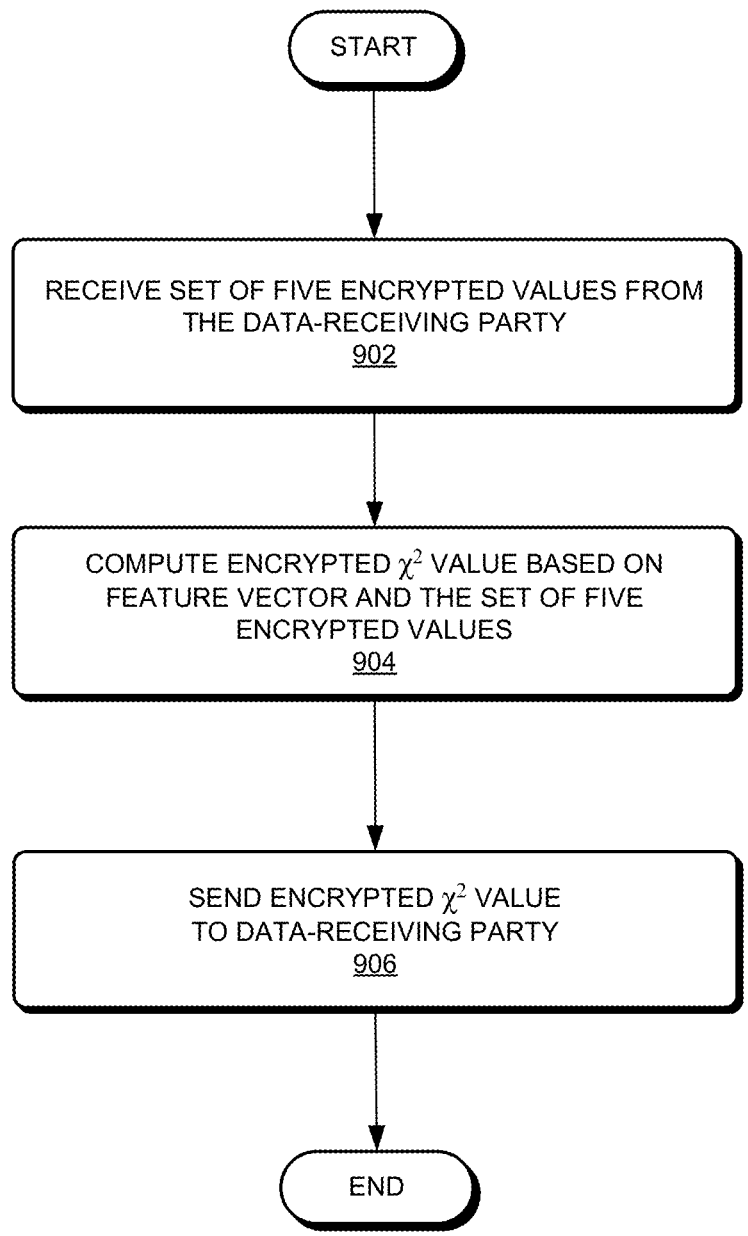
FIG. 9 presents a flowchart illustrating an exemplary method for performing round four of an alternative protocol by a data owner, in accordance with an embodiment.

FIG. 9 presents a flowchart illustrating an exemplary method for performing round four of an alternative protocol by a data owner, in accordance with an embodiment. During operation, data owner Felix may receive a set of five encrypted values from the data-receiving party (operation 902). Data owner Felix may compute an encrypted $\chi^2$ value based on a feature vector f and the set of five encrypted values (operation 904).

Data owner Felix may perform the following computations.

1. Eliminate r from the first two encrypted values by computing $$Enc_{pk}\left(\frac{(r+D)^2}{(B+D)(A+C)}\right) \oplus \left(r^2 \otimes Enc_{pk}\left(\frac{1}{(B+D)(A+C)}\right)\right) \oplus$$

$$\left(-2r \otimes Enc_{pk}\left(\frac{(r+D)}{(B+D)(A+C)}\right)\right) = Enc_{pk}\left(\frac{D^2}{(B+D)(A+C)}\right)$$

and $$Enc_{pk}\left(\frac{(r+D)}{(A+C)}\right) \oplus \left(-r \otimes Enc_{pk}\left(\frac{1}{A+C}\right)\right) = Enc_{pk}\left(\frac{D}{A+C}\right)$$

2. Compute an encryption of $\chi^2$(f, c) by computing:

$$\left(\frac{n^3}{(A+B)(C+D)} \otimes Enc_{pk}\left(\frac{D^2}{(B+D)(A+C)}\right)\right) \oplus$$

$$\left(\frac{n(C+D)}{A+B} \otimes Enc_{pk}\left(\frac{B+D}{A+C}\right)\right) \oplus \left(\frac{-2n^2}{A+B} \otimes Enc_{pk}\left(\frac{D}{A+C}\right)\right),$$

where C+D and A+B are computed as $$C+D=\Sigma_{i=1}^n f_i$$

and $$A+B=n-(C+D).$$

As shown below the above computation gives $Enc_{pk}(\chi^2$(f, c)).

Since AD−BC=(A+B+C+D)D−(B+D)(C+D), $\chi^2$(f, c) can be decomposed as follows:

$$\chi^2(f,c) = \frac{n(AD-BC)^2}{(A+C)(A+B)(C+D)(B+D)}$$

$$= \frac{n^3}{(A+B)(C+D)} \frac{D^2}{(B+D)(A+C)} +$$

$$\frac{n(C+D)}{(A+B)} \frac{(B+D)}{(A+C)} - \frac{2n^2}{(A+B)} \frac{D}{(A+C)}.$$

3. Send the following value to Carol (operation 906):

$$Enc_{pk}(\chi^2(f,c))$$

Local Computation

Data-receiving party Carol may decrypt $Enc_{pk}(\chi^2$(f, c)) to obtain $\chi^2$(f, c). Note that only Carol receives the value $\chi^2$(f, c). Depending on the application, if Felix also needs to know the value of $\chi^2$(f, c), Carol may then send the value of $\chi^2$(f, c) to Felix after running the protocol.

Figure 10:
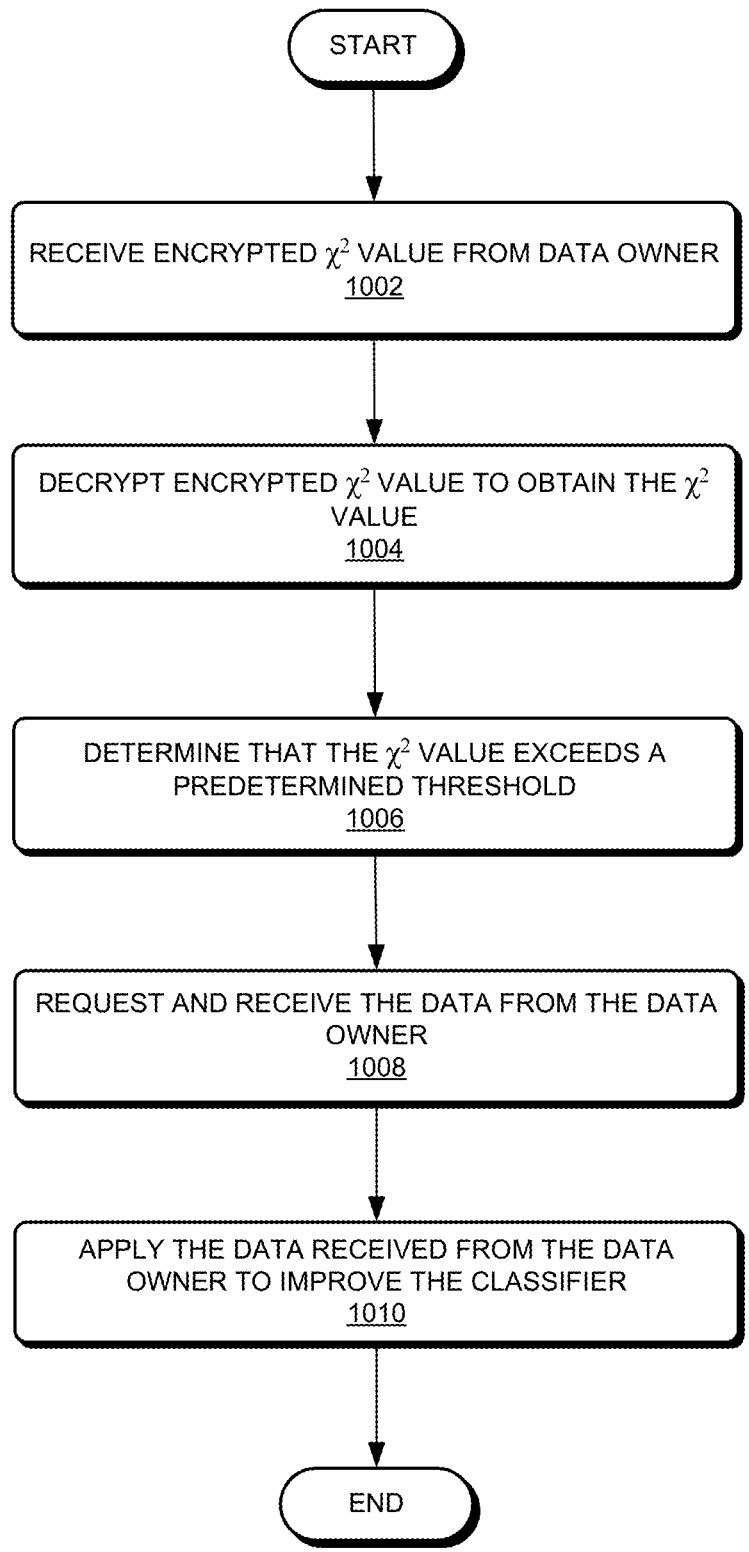
FIG. 10 presents a flowchart illustrating an exemplary method for applying data to improve a classifier, in accordance with an embodiment.

FIG. 10 presents a flowchart illustrating an exemplary method for applying data to improve a classifier, in accordance with an embodiment. During operation, the data-receiving party may receive an encrypted $\chi^2$ value from the data owner (operation 1002). The data-receiving party may decrypt the encrypted $\chi^2$ value to obtain the $\chi^2$ value (operation 1004). The data-receiving party may determine that the $\chi^2$ value exceeds a predetermined threshold (operation 1006). The data-receiving party may request and receive the data from the data owner (operation 1008). The data-receiving party may then apply the data received from the data owner to improve the classifier (operation 1010).

Exemplary Apparatus

Figure 11:
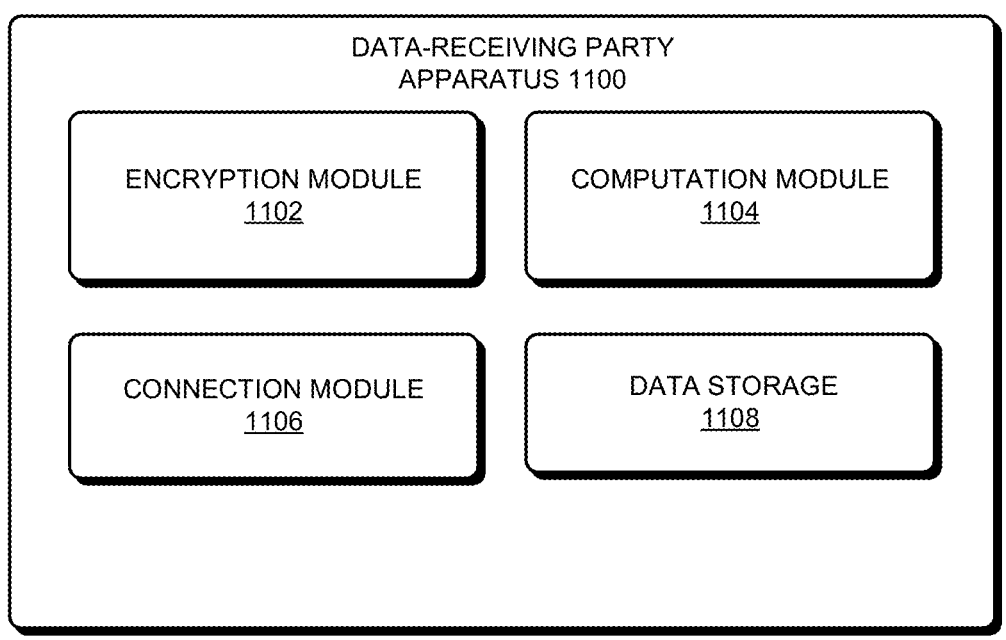
FIG. 11 presents a block diagram illustrating an exemplary apparatus associated with a data-receiving party, in accordance with an embodiment.

FIG. 11 presents a block diagram illustrating an exemplary apparatus 1100 associated with a data-receiving party, in accordance with an embodiment. Apparatus 1100 can comprise a plurality of modules which may communicate with one another via a wired or wireless communication channel. Apparatus 1100 may be realized using one or more integrated circuits, and may include fewer or more modules than those shown in FIG. 11. Further, apparatus 1100 may be integrated in a computer system, or realized as a separate device which is capable of communicating with other computer systems and/or devices.

Specifically, apparatus 1100 can comprise any combination of an encryption module 1102, a computation module 1104, a connection module 1106, and a data storage 1108. Note that apparatus 1100 may also include additional modules and data not depicted in FIG. 11, and different implementations may arrange functionality according to a different set of modules. The embodiments disclosed herein are not limited to any particular arrangement of modules.

Some implementations may include encryption module 1102 which may perform operations including encrypting and decrypting data, generating a key pair, and encrypting data such as feature vector data. Computation module 1104 may perform computations associated with the protocol, such as computing an intermediate value. Connection module 1106 may establish connections with the server and other computing devices. Data storage 1108 may store the data described herein, such as the data in feature vectors.

Exemplary Apparatus

Figure 12:
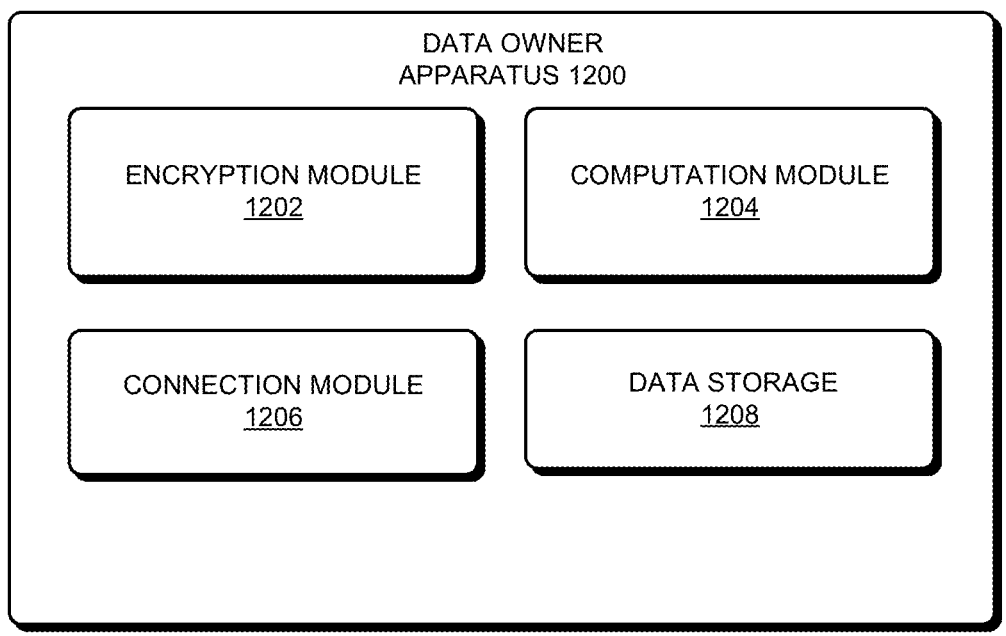
FIG. 12 presents a block diagram illustrating an exemplary apparatus associated with a data owner, in accordance with an embodiment.

FIG. 12 presents a block diagram illustrating an exemplary apparatus 1200 associated with a data owner, in accordance with an embodiment. Apparatus 1200 can comprise a plurality of modules which may communicate with one another via a wired or wireless communication channel. Apparatus 1200 may be realized using one or more integrated circuits, and may include fewer or more modules than those shown in FIG. 12. Further, apparatus 1200 may be integrated in a computer system, or realized as a separate device which is capable of communicating with other computer systems and/or devices.

Specifically, apparatus 1200 can comprise any combination of an encryption module 1202, a computation module 1204, a connection module 1206, and a data storage 1208. Note that apparatus 1200 may also include additional modules and data not depicted in FIG. 12, and different implementations may arrange functionality according to a different set of modules. The embodiments disclosed herein are not limited to any particular arrangement of modules.

Some implementations may include encryption module 1202 which may encrypt and decrypt data. Computation module 1204 may perform the computations associated with the protocol. Connection module 1206 may establish connections with the server and other computing devices. Data storage 1208 may store the data described herein.

Exemplary Computer and Communication System

Figure 13:
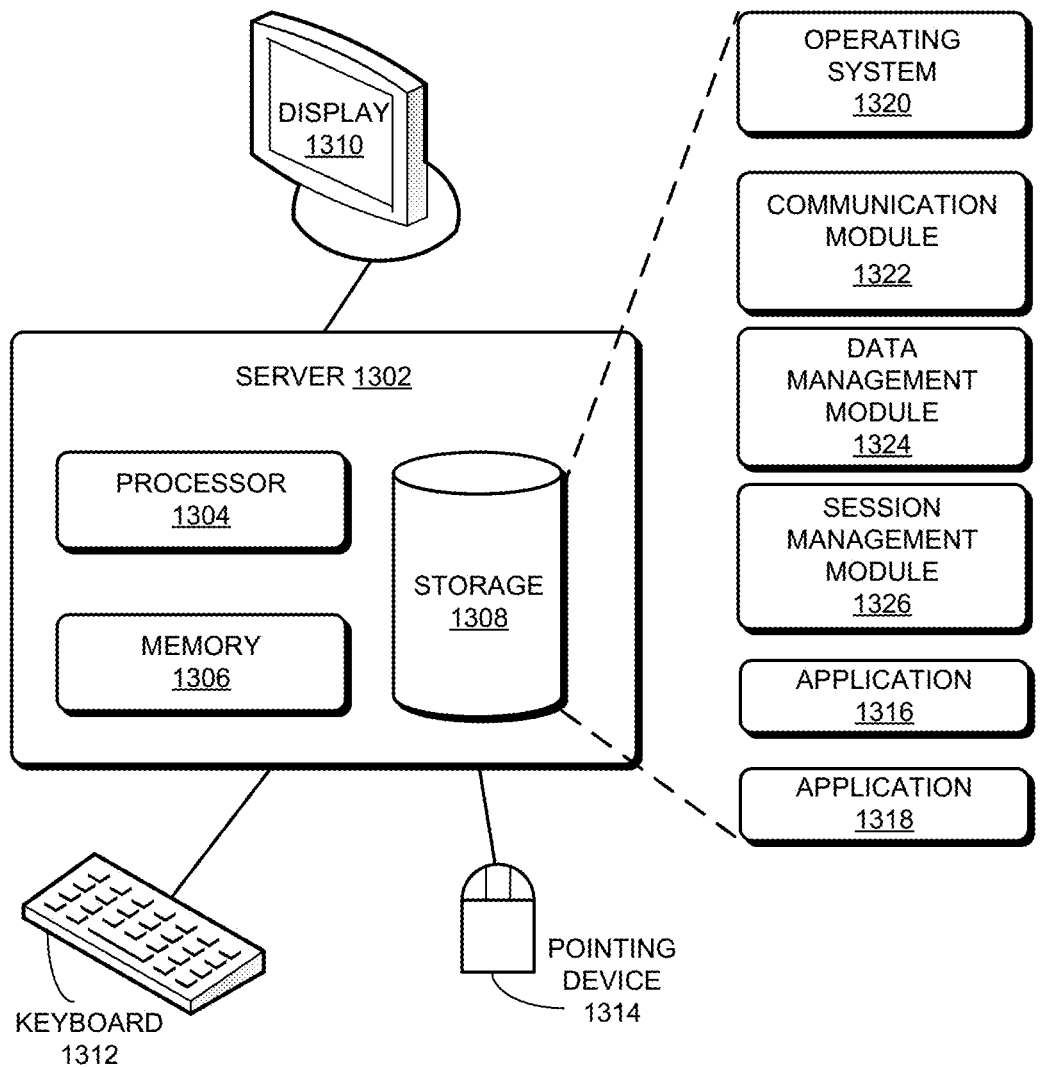
FIG. 13 illustrates an exemplary computer and communication system that facilitates a classifier enhancement system, in accordance with an embodiment.

FIG. 13 illustrates an exemplary computer and communication system that facilitates a classifier enhancement system, in accordance with an embodiment. A computer and communication system 1302 includes a processor 1304, a memory 1306, and a storage device 1308. Memory 1306 can include a volatile memory (e.g., RAM) that serves as a managed memory, and can be used to store one or more memory pools. Furthermore, computer and communication system 1302 can be coupled to a display device 1310, a keyboard 1312, and a pointing device 1314.

Storage device 1308 can store a number of applications, such as applications 1316 and 1318 and operating system 1320. Storage device 1308 may also store code for a communication module 1322, a data management module 1324, and a session management module 1326. Communication module 1322 may establish network connections with client computing devices. Data management module 1324 may manage the data received from the computing devices, including allocating memory and/or disk storage space to store the data. Session management module 1326 may manage the sessions with the client computing devices, including establishing the session ID, sharing the session ID, storing the session ID, and terminating sessions.

During operation, one or more applications, such as communication module 1322, are loaded from storage device 1308 into memory 1306 and then executed by processor 1304. While executing the program, processor 1304 performs the aforementioned functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, the method comprising:
   exchanging, in multiple rounds between two or more parties, encrypted data and encrypted statistics computed for the data, wherein a statistic is a measure derived from one or more attributes of the data;
   building an encrypted utility statistic using computations in an encrypted domain; and
   applying, by at least one party, a respective private decryption key to decrypt the encrypted utility statistic to obtain a utility statistic,
   wherein the utility statistic indicates a utility of combining data from the two or more parties without any party sharing unencrypted data and without any party having a means to decrypt data from another party.

2. The method of claim 1, further comprising:
   securely estimating, based on the utility statistic, the utility of combining data from the two or more parties,
   wherein no party shares unencrypted data with another party, and
   wherein no party has a means to decrypt data from another party.

3. The method of claim 1, further comprising:
   determining, by the two or more parties, that the utility statistic exceeds a predetermined threshold;
   agreeing, by the two or more parties based on the determination, on terms for transferring unencrypted data;
   transferring, to a first party by a second party, the unencrypted data based on the agreed terms; and
   applying, by the first party, the set of unencrypted data to improve a classifier or other model.

4. The method of claim 1,
   wherein building the encrypted utility statistic using computations in an encrypted domain is performed without sharing private decryption keys between the two or more parties.

5. The method of claim 1,
wherein applying, by the at least one party, the respective private decryption key to obtain the utility statistic is based on decrypting the encrypted utility statistic.

6. The method of claim 1,
wherein the at least one party comprises a first party associated with a first computing device and a second party associated with a second computing device,
wherein the utility statistic obtained by the first party is a first utility statistic computed in a two-stream mode, and
wherein the utility statistic obtained by the second party is a second utility statistic computed in the two-stream mode.

7. The method of claim 6, further comprising verifying, by the first computing device, that the first utility statistic is the same as the second utility statistic, which comprises:
re-encrypting the first utility statistic based on a first single-use key;
subsequent to sending the re-encrypted first utility statistic to the second computing device, receiving a second single-use key from the second computing device;
subsequent to receiving a re-encrypted second utility statistic from the second computing device, wherein the second utility statistic is encrypted based on the second single-use key, sending the first single-use key to the second computing device;
decrypting the re-encrypted second utility statistic based on the second single-use key; and
determining that the decrypted second utility statistic is the same as the first utility statistic.

8. The method of claim 7,
wherein sending the first single-use key to the second computing device comprises sending the first single-use key encrypted based on a public key of the second computing device, and
wherein the received second single-use key is encrypted based on public key of the first computing device.

9. A computing system for obtaining a utility statistic, the system comprising:
one or more processors,
a non-transitory computer-readable medium coupled to the one or more processors having instructions stored thereon that, when executed by the one or more processors, cause the one or more processors to perform a method, the method comprising:
exchanging, in multiple rounds between two or more parties, encrypted data and encrypted statistics computed for the data, wherein a statistic is a measure derived from one or more attributes of the data;
building an encrypted utility statistic using computations in an encrypted domain; and
applying, by at least one party, a respective private decryption key to decrypt the encrypted utility statistic to obtain a utility statistic,
wherein the utility statistic indicates a utility of combining data from the two or more parties without any party sharing unencrypted data and without any party having a means to decrypt data from another party.

10. The computing system of claim 9, wherein the method further comprises:
securely estimating, based on the utility statistic, the utility of combining data from the two or more parties, wherein no party shares unencrypted data with another party, and
wherein no party has a means to decrypt data from another party.

11. The computing system of claim 9, wherein the method further comprises:
determining, by the two or more parties, that the utility statistic exceeds a predetermined threshold;
agreeing, by the two or more parties based on the determination, on terms for transferring unencrypted data;
transferring, to a first party by a second party, the unencrypted data based on the agreed terms; and
applying, by the first party, the set of unencrypted data to improve a classifier or other model.

12. The computing system of claim 9,
wherein building the encrypted utility statistic using computations in an encrypted domain is performed without sharing private decryption keys between the two or more parties.

13. The computing system of claim 9,
wherein applying, by the at least one party, the respective private decryption key to obtain the utility statistic is based on decrypting the encrypted utility statistic.

14. The computing system of claim 9,
wherein the at least one party comprises a first party associated with a first computing device and a second party associated with a second computing device,
wherein the utility statistic obtained by the first party is a first utility statistic computed in a two-stream mode, and
wherein the utility statistic obtained by the second party is a second utility statistic computed in the two-stream mode.

15. The computing system of claim 14, wherein the method further comprises verifying, by the first computing device, that the first utility statistic is the same as the second utility statistic, which comprises:
re-encrypting the first utility statistic based on a first single-use key;
subsequent to sending the re-encrypted first utility statistic to the second computing device, receiving a second single-use key from the second computing device;
subsequent to receiving a re-encrypted second utility statistic from the second computing device, wherein the second utility statistic is encrypted based on the second single-use key, sending the first single-use key to the second computing device;
decrypting the re-encrypted second utility statistic based on the second single-use key; and
determining that the decrypted second utility statistic is the same as the first utility statistic.

16. The computing system of claim 15,
wherein sending the first single-use key to the second computing device comprises sending the first single-use key encrypted based on a public key of the second computing device, and
wherein the received second single-use key is encrypted based on public key of the first computing device.

17. A non-transitory computer-readable storage medium storing instructions that when executed by a computer cause the computer to perform a method, the method comprising:
exchanging, in multiple rounds between two or more parties, encrypted data and encrypted statistics computed for the data, wherein a statistic is a measure derived from one or more attributes of the data;
building an encrypted utility statistic using computations in an encrypted domain; and
applying, by at least one party, a respective private decryption key to decrypt the encrypted utility statistic to obtain a utility statistic, wherein the utility statistic indicates a utility of combining data from the two or more parties without any party sharing unencrypted data and without any party having a means to decrypt data from another party.

18. The non-transitory computer-readable storage medium of claim 17, wherein the method comprises:
securely estimating, based on the utility statistic, the utility of combining data from the two or more parties, wherein no party shares unencrypted data with another party, and
wherein no party has a means to decrypt data from another party.

19. The non-transitory computer-readable storage medium of claim 17, wherein the method further comprises:
determining, by the two or more parties, that the utility statistic exceeds a predetermined threshold;
agreeing, by the two or more parties based on the determination, on terms for transferring unencrypted data;
transferring, to a first party by a second party, the unencrypted data based on the agreed terms; and
applying, by the first party, the set of unencrypted data to improve a classifier or other model.

20. The non-transitory computer-readable storage medium of claim 17,
wherein building the encrypted utility statistic using computations in an encrypted domain is performed without sharing private decryption keys between the two or more parties.

* * * * *